(12) United States Patent
O'Connor et al.

(10) Patent No.: US 10,064,119 B2
(45) Date of Patent: Aug. 28, 2018

(54) ATTENUATION DEVICE IN TRANSMITTER SYSTEM

(71) Applicant: Google LLC, Mountain View, CA (US)

(72) Inventors: Timothy Michael O'Connor, Sunol, CA (US); Toktam Nezakati Esmaeelzadeh, Menlo Park, CA (US); Siyuan Xin, Los Altos, CA (US); Robert John Schlaefli, Morgan Hill, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/390,934

(22) Filed: Dec. 27, 2016

(65) Prior Publication Data

US 2018/0184355 A1    Jun. 28, 2018

(51) Int. Cl.
  *H04B 1/02*     (2006.01)
  *H04W 40/16*   (2009.01)
  *H04W 4/00*    (2018.01)
  *H04W 4/80*    (2018.01)

(52) U.S. Cl.
  CPC .......... *H04W 40/16* (2013.01); *H04W 4/008* (2013.01); *H04W 4/80* (2018.02)

(58) Field of Classification Search
  CPC ................................ H04W 40/16; H04W 4/08
  USPC ......................................................... 455/91
  See application file for complete search history.

(56) References Cited

U.S. PATENT DOCUMENTS

| 8,666,342 B1* | 3/2014 | Adabi | H01P 1/22 455/127.2 |
|---|---|---|---|
| 2004/0169604 A1* | 9/2004 | Lee | H01Q 13/10 343/700 MS |
| 2006/0268194 A1* | 11/2006 | Morimoto | G02F 1/133615 349/65 |
| 2008/0032653 A1* | 2/2008 | Inoue | H01P 1/22 455/249.1 |
| 2010/0141363 A1* | 6/2010 | Yan | H01P 1/227 333/81 R |
| 2016/0043715 A1* | 2/2016 | Kurokawa | H03K 17/687 365/189.011 |

FOREIGN PATENT DOCUMENTS

WO    WO1997038437    10/1997
WO    WO2015070204    5/2015

* cited by examiner

*Primary Examiner* — Sanh Phu
(74) *Attorney, Agent, or Firm* — Fish & Richardson P.C.

(57) ABSTRACT

An attenuation device inclusive of radio frequency (RF) absorber materials to reduce signal power in transmission systems involved in short range communication systems is described. The attenuation device is placed between a radio transmitter and an antenna in a transmission system. The attenuation device may be coated with protective material, and may have small dimensions such that the organization and dimensions of the transmission system are not significantly modified. The attenuation device reduces the power of a signal to be transmitted to a receiver, and has a good return loss indicative of a relatively low mismatch with the antenna.

19 Claims, 7 Drawing Sheets

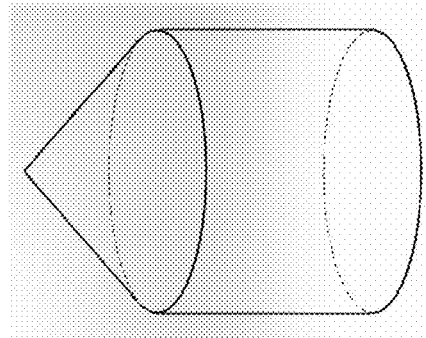
FIG. 4D
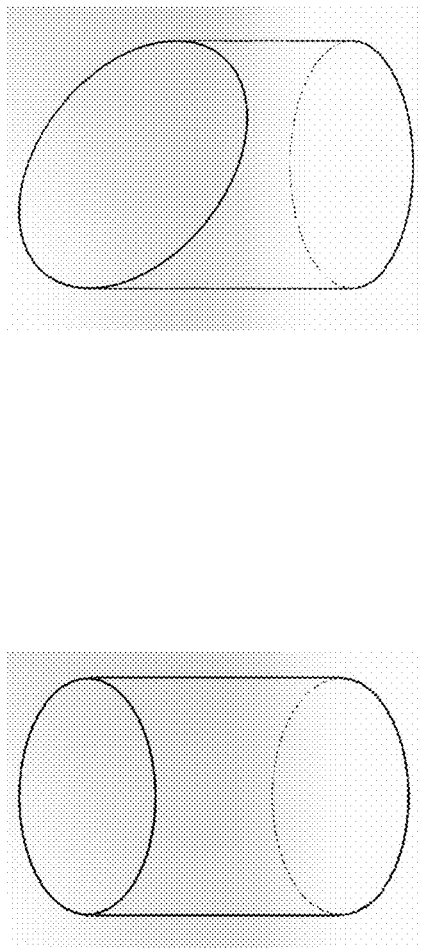
FIG. 4B
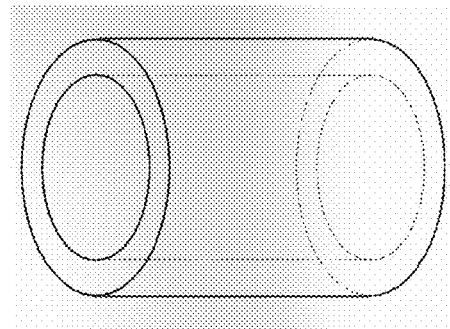
FIG. 4C
FIG. 4A

| Absorber Thickness (inches) | Attenuation (dB) |
|---|---|
| 0.1 | 6 |
| 0.19 | 10 |
| 0.29 | 15 |

FIG. 5

ATTENUATION DEVICE IN TRANSMITTER SYSTEM

BACKGROUND

Data is increasingly being transmitted over short and long distances to wirelessly connect users located in urban and rural environments. However, electronic equipment, such as radios and transmitters, utilized for supporting wireless data transmissions over short and long distances often differ resulting in non-uniformity of network architecture as well as increased costs.

SUMMARY

In general, innovative aspects of the subject matter described in this specification can be embodied in a system that includes an attenuator device, which includes a housing and an attenuator. The housing defines an outer surface and an inner volume, and directly contacts a radio transmitter and an antenna. The attenuator is disposed within the inner volume of the housing and has a shape such that when disposed between the radio transmitter and the antenna, the attenuator receives a signal from the radio transmitter at a first power level, and reduces a signal power of the signal to a second power level below the first power level.

Other innovative aspects of the subject matter described in this specification can be embodied in a method that includes receiving a signal at a first power level at an attenuator device that is disposed between a radio transmitter and an antenna and that directly contacts the radio transmitter and the antenna. The method also includes reducing, using an attenuator in the attenuator device, a signal power of the generated signal to a second power level below the first power level. A central axis of the attenuator being co-aligned with a signal path of the signal between the radio transmitter and the antenna. The central axis extends along a width of the attenuator and a length of the attenuator device. The method also includes providing the signal to the antenna at the second power level.

In some implementations, the radio transmitter is configured to generate the signal at the first power level for transmission to the attenuator. The antenna is coupled to the radio transmitter, and is configured to transmit the signal at a third power level greater than the first power level.

In some implementations, the antenna is configured to apply a gain to the signal having the second power level. The applied gain sets a power level of the signal to the third power level.

In some implementations, the attenuator provides an attenuation of about 6 dB, about 10 dB, or about 15 dB.

In some implementations, the attenuator includes one or more of foam absorbers, polyurethane, polyethylene, ferrites, carbon-based foam absorbers, carbon nanotubes, and silicon rubber.

In some implementations, the attenuator the attenuator has one of a cylindrical shape or a doughnut shape.

In some implementations, the attenuator is disposed in a central region of an interface between the radio transmitter and the antenna.

In some implementations, a central axis of the attenuator is co-aligned with a signal path of the generated signal between the radio transmitter and the antenna. The central axis extends along a length of the attenuator and a width of the attenuator device.

In some implementations, the attenuator device further includes an Iodine layer disposed on the attenuator and configured to protect the attenuator from damage.

In some implementations, the attenuator extends along an entire width of the attenuation device.

Other aspects include corresponding methods, systems, apparatus, computer-readable storage media, and computer programs configured to implement the above-noted embodiments.

The above-noted aspects and implementations further described in this specification may offer several advantages. For example, an attenuation device may be utilized for reducing power of signals transmitted over short distances without modifying the design of a radio or antenna also used for long distance data transmission. This solves the technical problem of receiver saturation or overload that occurs due to low free space loss when systems are placed within close proximity of each other. Because different equipment designs do not have to be used for short and long distance communications, a wireless network may deploy the same wireless network equipment for short and long distance communications, with the addition of a cheap attenuation device used for short distance communications. As a result, a wireless network may have greater uniformity, and system design, deployment, and maintenance may be cheaper. Furthermore, the attenuation device described in this specification is small in size, easy to fabricate, not fragile, and can therefore be easily deployed in various environments and networks.

The details of one or more aspects described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A, 4B, 4C, and 4D depict various exemplary shapes of an attenuation device.

FIG. 5 depicts a table with various properties associated with absorber material in an attenuation device.

Like reference numbers and designations in the various drawings indicate like elements.

DETAILED DESCRIPTION

This disclosure generally relates to utilizing an attenuation device that includes radio frequency (RF) absorber materials to reduce signal power in transmission systems involved in short range communication systems. The attenuation device is positioned between a radio transmitter and an antenna in a transmitter system. The attenuation device may have small dimensions such that the physical architecture and dimensions of the transmission system are not significantly modified. While the attenuation device reduces the power of a signal to be transmitted to a receiver, the attenuation device also has a return loss that is less than a threshold and indicates a low mismatch.

Figure 1A:
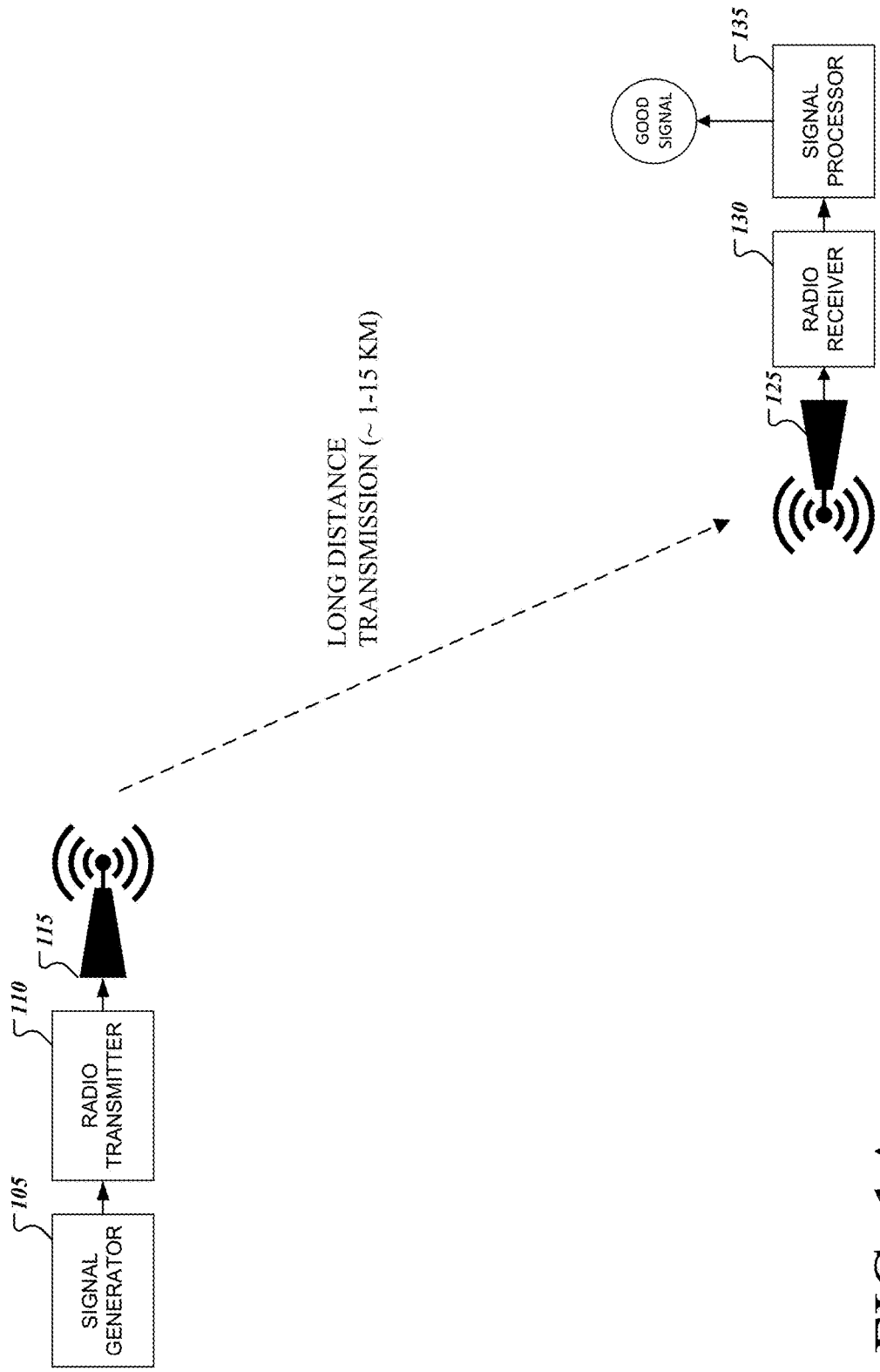
FIG. 1A depicts an exemplary scenario in which a high power signal is transmitted over long distances.

FIG. 1A depicts an exemplary scenario in which a high power signal is transmitted over long distances. Large or long distances may refer to distances greater than approximately one kilometer, i.e., 0.6 miles, and less than approximately 15 kilometers, i.e., 9.3 miles. When transmitting signals over long distances, a transmitter system may transmit signals at a high power level. For example, a transmitter system may generate a signal in the E-band at power levels greater than 40 dB. The high power signal may incur free space loss (FSL) over long distances which, in some cases, may be over approximately 95 dB. A receiver system may then use signal amplification to recover and process the received signal.

Referring to FIG. 1A, a transmitter system may include a signal generator 105, a radio transmitter 110, and a transmission (TX) antenna 115. The signal generator 105 may include various hardware and software components, including but not limited to, one or more power sources, one or more processors, one or more converters, one or more oscillators, one or more filters, one or more inverse fast Fourier transform (IFFT) modules, one or more encoders, one or more multiplexers, one or more digital circuits, one or more digital to analog converters (DAC), and one or more buffers. Although illustrated as separate components, in some implementations, the signal generator 105 and radio transmitter 110 may be implemented as one component of a transmitter system.

The signal generator 105 generates a signal that includes data to be transmitted to a destination device. In FIG. 1A, the destination device or receiving system is located at a large distance, for example, between 1-15 kilometers, from the transmitting system. The transmitted data may include any type of electronic data.

The generated signal is provided to a radio transmitter 110, which may include various hardware and software components, including but not limited to, one or more high power amplifiers, one or more filters, and one or more modulators. The radio transmitter 110 may also include or be attached to a transmission line or feed line that includes an antenna coupling network or antenna tuner. The radio transmitter 110 may process the generated signal to provide the generated signal for transmission to the TX antenna 115. For example, radio transmitter 110 may process the generated signal to be transmitted at a particular frequency range, e.g., the E-band, and may amplify the signal power with a gain of, for example, 7-8 dB. Other levels of amplification may also be used.

In general, an antenna converts electrical signals into radio waves, and propagates the radio waves in certain directions. TX antenna 115 may be any suitable type of antenna, and transmits the signal provided by radio transmitter 110 to the receiver system, which is located at a large distance away from the radio transmitter 110. TX antenna 115 may apply an antenna gain which increases the power of the signal being transmitted by the transmitter system. The antenna gain may be determined by various parameters such as a frequency of the signal being transmitted, antenna design including materials used to construct the antenna, and antenna directivity. In some cases, the antenna gain may be greater than 40 dB.

The receiver system may include a receiver (RX) antenna 125, a radio receiver 130, and a signal processor 135. The RX antenna 125 may receive the signal from the TX antenna 115, and may convert the received signal from a radio wave to an electrical signal. Because the received signal has propagated over a long distance, the signal may be significantly compromised by free space loss and noise. For example, a received signal may have incurred over 100 dB FSL and may have a power level of approximately −50 dBm when received at the receiver system. Other power levels may also be used, and the example power levels described are illustrative.

The radio receiver 130 may include various hardware and software components, including but not limited to, one or more low noise amplifiers (LNAs) one or more filters, and one or more demodulators. The radio receiver 130 may also include or be attached to a transmission line or feed line that includes an antenna coupling network or antenna tuner. The radio receiver 130 may process the received signal for further processing by the signal processor 135. For example, radio receiver 130 may process the received signal to increase the power level of the received signal by applying a gain on the received signal, and to convert the received signal to a particular frequency band for subsequent processing.

The signal processor 135 may receive the received signal from the radio receiver 130 and may further process the received signals for various suitable applications. The signal processor 135 may include various hardware and software components, including but not limited to, one or more processors, one or more converters, one or more oscillators, one or more filters, one or more fast Fourier transform (FFT) modules, one or more decoders, one or more demultiplexers, one or more digital circuits, one or more analog to digital converters (ADC), and one or more buffers. The signal processor 135 may process the received signal to extract data that can be used for any suitable application.

As described above, in the scenario depicted in FIG. 1A, a signal is transmitted by a transmitter system at a high power level, for example, above 50 dB. The transmitted signal propagates through free space, is attenuated by weather, noise, or FSL, and is received by the receiver system at a low power level. The receiver system then processes the received signal to extract data for further use.

Figure 1B:
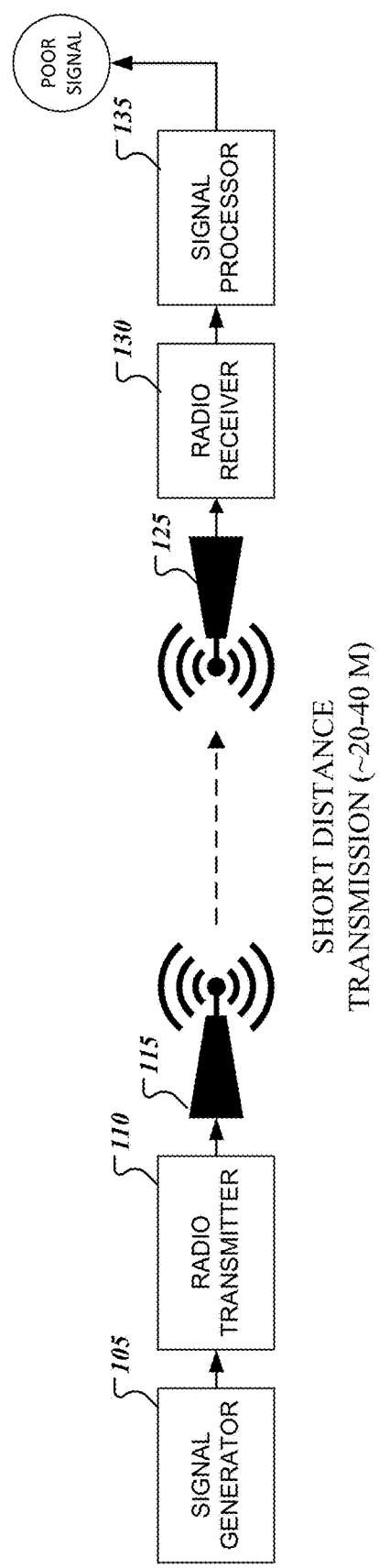
FIG. 1B depicts an exemplary scenario in which a high power signal is transmitted over short distances.

The system depicted in FIG. 1B includes the same system elements as FIG. 1A, however the distance between the transmitter system and the receiver system is short. Short or small distances may refer to distances greater than approximately 20 m, i.e., 0.01 miles, and less than approximately 40 m, i.e., 0.024 miles. Other ranges can also be used to define a short or small distance. When a signal is received by the receiver system at a short distance, as in FIG. 1B, the power of the received signal may overload the receiver system due to the shorter distance, thereby resulting in a poor recovered signal. For example, a LNA in the receiver system may be driven into saturation by virtue of the high power received signal, which results in increased noise, low gain, and a poor output signal. In such cases, the signal output by signal processor 135 may be degraded to the point where the signal may not provide reliable data for further application and use.

Figure 2:
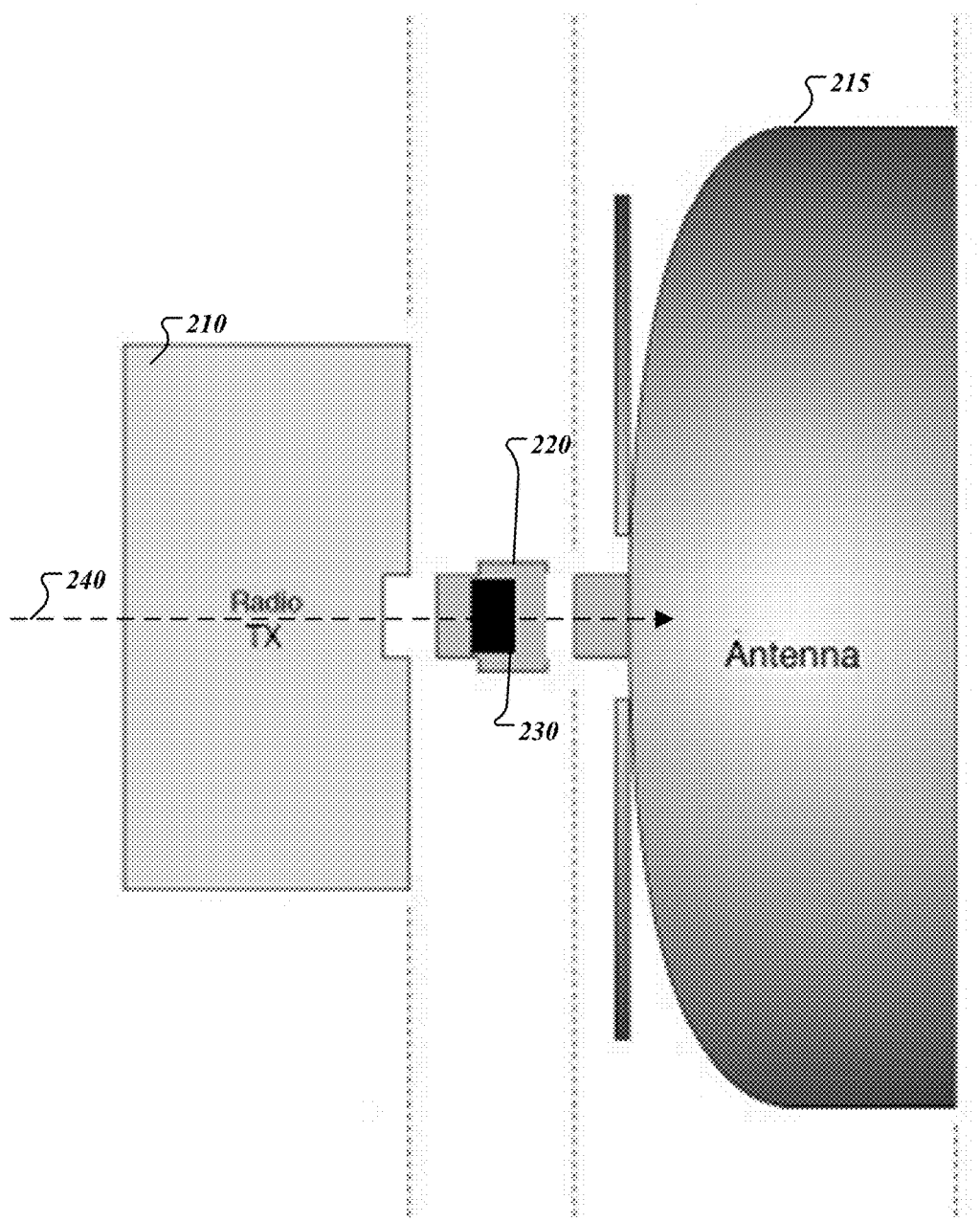
FIG. 2 depicts an exemplary diagram of a transmission system with an attenuation device.
Figure 3:
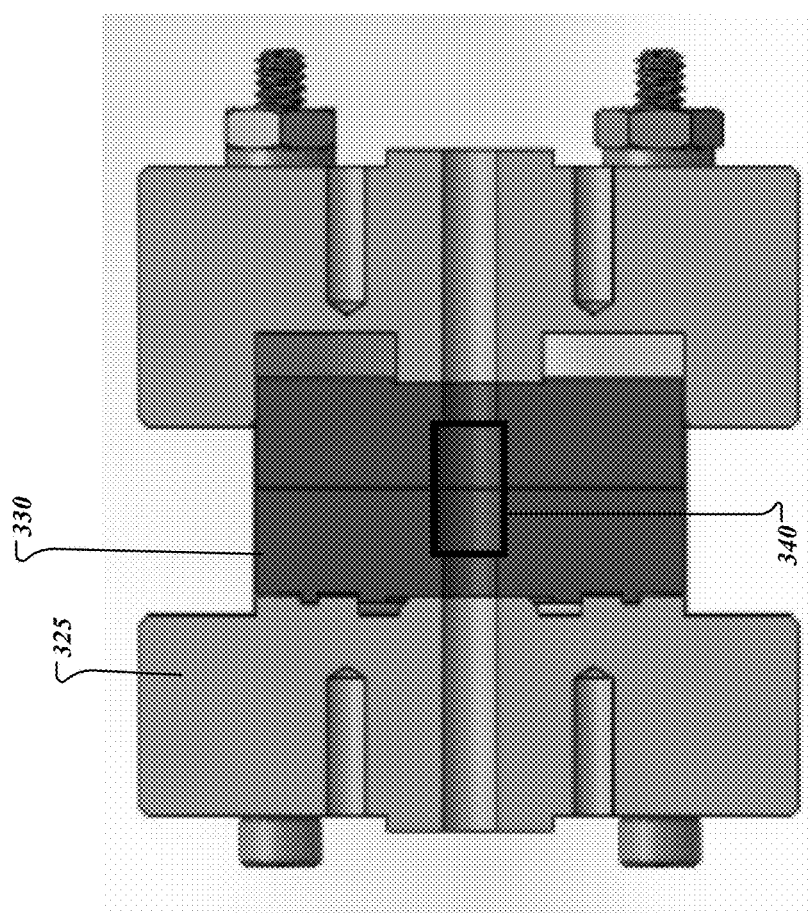
FIG. 3 depicts a side sectional view of the attenuation device.

To address the problem described above, an attenuation device may be introduced in transmitter systems used for short distance transmissions, as illustrated in FIG. 2. FIG. 2 depicts a transmission system with an attenuation device 220. A side sectional view of an exemplary attenuation device is shown in FIG. 3. The attenuation device 220 is placed between a radio transmitter 210 and a TX antenna 215, and directly contacts the radio transmitter 210 and the TX antenna 215. The radio transmitter 210 and the TX antenna 215 may be the same as the radio transmitter 110 and the TX antenna 115 described with reference to FIGS. 1A and 1B.

In contrast to systems in which attenuating or absorbing materials are applied on the walls of a cavity, the attenuation device 220 may include an attenuator 230/330 with absorber material 340 that is placed directly in the signal path 240 between the radio transmitter 210 and the TX antenna 215. A central axis of the attenuation device 220 may be co-aligned with the signal path 240. The central axis of the attenuation device 220 extends along a width of the attenuator 230/330, a length of the absorber material 340, and a length of the attenuation device 220. Absorber material 340 of the attenuation device 220 may be located in a central area of the antenna-radio interface in line with and overlapping the signal path 240 so that attenuation of a signal may be attained through use of the absorber material 340 in the attenuation device 220. The central area may be equidistant from the radio transmitter 210 and the TX antenna 215, and may be located on the central axis of the attenuation device 220. In some cases, a front face of the attenuator 230/330 that receives a signal from radio transmitter 210 may be oriented such that it is substantially perpendicular to the signal path 240.

In general, the attenuation device 220 may have various shapes and sizes and may be used with various types of antennas and radio transmitters. In some implementations, as shown in FIGS. 2 and 3, an attenuation device 220 may include a housing 325 with a cavity in which the attenuator 230/330 is disposed.

Housing 325 provides the mechanical structure to support and align attenuator 230/330, and to support and align interfaces with the radio transmitter 210 and TX antenna 215. For example, the outer circumferences of the housing 325 may match the outer dimensions in the antenna-radio interface such that the attenuation device 220 may fit the antenna-radio interface. In particular, an outer circumference at an input of the housing 325 may match a circumference of the output port of a radio transmitter 210, so that the housing 325 can be mounted to the output port of a radio transmitter 210. An outer circumference at an output of the housing 325 may match a circumference of the input port of the TX antenna 215, so that the housing 325 can be mounted to the input port of TX antenna 215. In some cases, the outer circumferences of the input and the output of the housing 325 may be the same. In some cases, the outer circumferences of the input and the output of the housing 325 may be different.

Housing 325 may be formed using various conductive materials such as, for example, brass, copper, and silver. In some implementations, housing 325 includes aluminum. The conductive materials allow various modes of an electromagnetic wave to propagate in a direction along the length of the housing 325. Housing 325 also functions as a reflection boundary to facilitate wave reflections within housing 325 and through attenuator 230/330, and to contain the electromagnetic wave within the housing 325.

As noted above, housing 325 may include a cavity in which the attenuator 230/330 is disposed. The cavity may have a diameter corresponding to an inner circumference of the housing 325. The diameter corresponding to an inner circumference of the housing 325 may match inner dimensions of the antenna-radio interface.

The absorber material 340 in the housing 325 may include various absorber materials including, but not limited to, one or more of foam absorbers, polyurethane, polyethylene, ferrites, carbon-based foam absorbers, carbon nanotubes, and silicon rubber. The absorber material 340 may dampen a signal amplitude of a propagating electromagnetic signal. For example, a power level of an electromagnetic wave received from radio transmitter 210 may decrease after propagating through the absorber material 340. The amount of dampening may vary based on the type of material used as the absorbing material 340 and the properties of the material such as thickness, density, shape, and permittivity.

The absorber material 340 is flexible and easy to cut and install, so that various shapes and sizes of absorber materials 340 can be formed and used. For example, in some implementations, the absorber material 340 may have a three-dimensional foam structure. In some implementations, the absorber material 340 may be formed using powder materials. In some implementations, the absorber material 340 may include one or more highly absorbing paint layers.

In some implementations, adhesive material may be used to bond the absorber material 340 to the attenuator 230/330. Adhesive materials may include, but are not limited to, elastomers, epoxies, urethanes, nitriles, contact adhesives and pressure-sensitive adhesives.

As illustrated in FIGS. 4A 4B, 4C, and 4D, the absorber material 340 may have various suitable shapes. For example, the absorber material 340 may have a cylindrical shape, a doughnut shape, or a variation or combination of one or more three-dimensional shapes such as a cone and a cylinder, or a sliced cylinder. Different shapes may provide different amounts of attenuation, mismatch, and return loss. Accordingly, the design of the absorber material 340 may be selected or determined based on multiple factors such as the antenna type, the desired attenuation, gain, or loss, and the distance between the receiver and transmitter systems.

The flexibility in designing the absorber material 340 and the attenuation device 220 is useful for deploying attenuation devices in different environments with different antennas and transmitters. An attenuation device can be designed to provide the desired attenuation for a signal being transmitted by a particular transmitter system over a short distance. Various properties such as a thickness, length, shape, or permittivity of an absorber material 340 can be determined by a designer to provide the desired signal loss in a transmitter system. For example, as shown in FIG. 5, in some implementations, an absorber material 340 having a cylindrical shape and a thickness of 0.1 inches may provide an attenuation of 6 dB. In some implementations, an absorber material 340 having a cylindrical shape and a thickness of 0.19 inches may provide an attenuation of 10 dB. In some implementations, an absorber material 340 having a cylindrical shape and a thickness of 0.29 inches may provide an attenuation of 15 dB. Other values may also be realized, depending on the absorber material, the shape, and the dimensions used.

Figure 6:
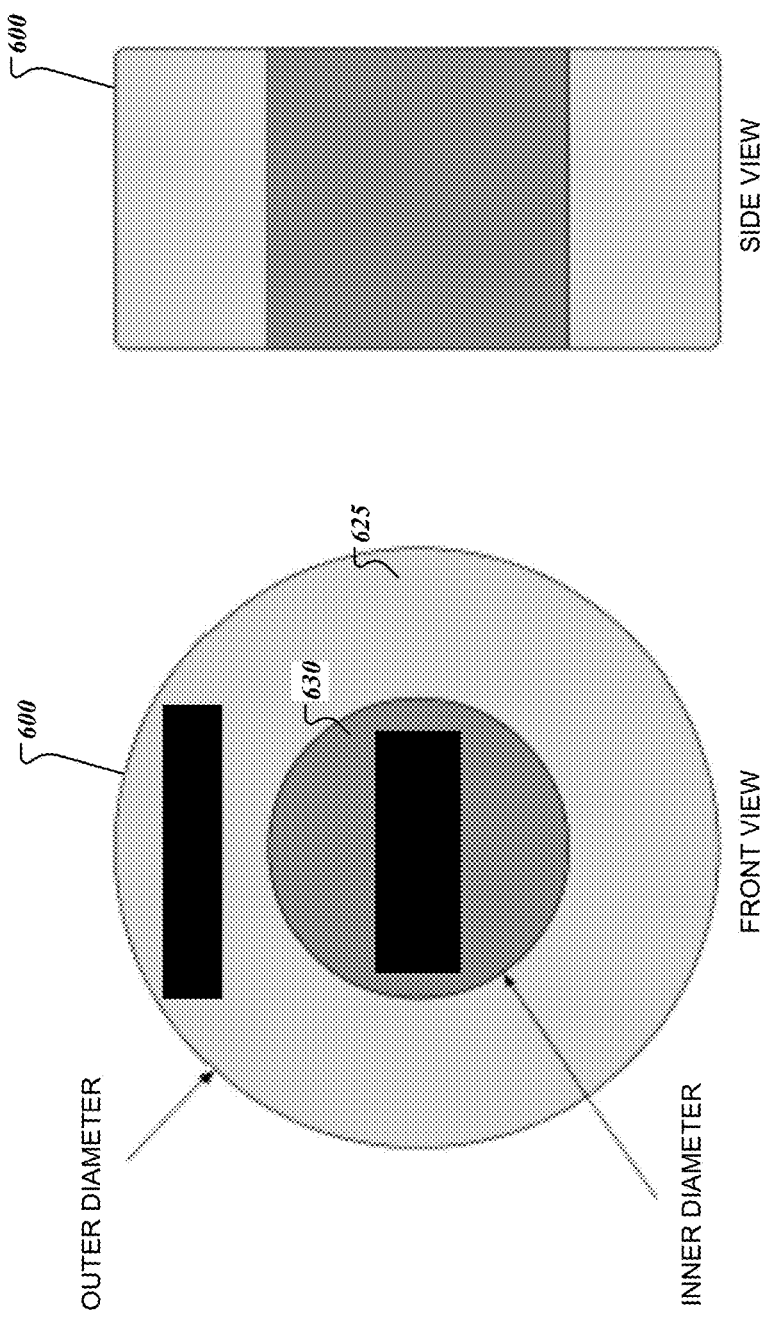
FIG. 6 depicts front and side views of an attenuation puck.

Referring to FIG. 6, in some implementations, an attenuation puck 600 may be implemented as the attenuator 230/330. The attenuation puck 600 may include a housing 625 and absorber material 630. Housing 625 may have outer circumferences that match the outer dimensions in the antenna-radio interface such that the attenuation puck 600 may fit the antenna-radio interface. An inner volume of attenuation puck 600 defining a cavity in housing 625 may be filled with the absorber material 630. The cavity in the attenuation puck may extend along the entire width of the attenuation puck 600 so that the absorber material 630 may be a portion of an outer surface of the attenuation puck 600. The absorber material 630 may be flexible, easy to cut and install, may have various shapes, sizes, and may be made of various absorbing materials as described above with reference to absorber material 340.

In some implementations, an attenuation puck 600 may be implemented in the cavity defined by the inner volume of the attenuation device 220. In such cases, the outer circumference of housing 625 may match one or more portions of the outer circumference of housing 325 such that housing 325 contains housing 625. The absorber material 630 may be disposed in a sub-cavity defined by an inner volume of housing 625.

An attenuation puck 600 may be coated with a layer of protective material to reduce corrosion, damage, and wear and tear of the absorber material 630. The protective material may, in some cases, be applied to an outermost surface of the absorber material 630, or between the housing 625 and absorber material 630. In general, various materials, such as Iodine, may be used as the protective material.

By implementing an attenuation device in the various manners described above, a more uniform implementation of components and devices across wireless networks can be implemented. For instance, different antennas and transmitters do not have to be used for short and long distance transmissions. Designs of short distance transmission networks can simply include an additional attenuator device compared to designs of long distance transmission networks. Unlike other attenuators and compensators, the attenuator device is relatively inexpensive, can be implemented using available absorber materials, is flexible to design and implement with various types of antennas, and has small dimensions thereby occupying less physical space in a transmitter system. The flexibility of design and ease to cut or modify absorber material in the attenuator device also makes it easier to test, design, and optimize return loss, antenna-attenuator device mismatch, voltage standing wave ratio (VSWR), and other parameters for controlling properties and performance of a transmission signal.

It should be appreciated that while the illustrated implementations describe transmitter systems, the attenuation device may also be used in receiver systems and disposed between a receiving antenna and a radio receiver. Implementing the attenuation device in a receiver may provide similar advantages, as described above, in receiver systems.

While this specification contains many specifics, these should not be construed as limitations on the scope of the disclosure or of what may be claimed, but rather as descriptions of features specific to particular implementations. Certain features may be implemented as separate embodiments or in combination in a single embodiment. Although features may be described above as acting in certain combinations and may even be claimed as such, one or more features from a claimed combination may in some cases be excised from the combination, and the claimed combination may be directed to a subcombination or variation of a subcombination.

Similarly, while actions are described in a particular order in this specification, the description should not be understood as requiring that such actions be performed in the particular order shown or in sequential order, or that all illustrated actions be performed, to achieve desirable results. Moreover, the separation of various system components in the implementations described above should not be understood as requiring such separation in all implementations.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A system comprising:
an attenuator device, comprising:
a housing having an outer surface and an inner surface, the outer surface directly contacting a radio transmitter and an antenna; and
absorber material having (i) an outer circumference that matches a circumference of the inner surface of the housing, and (ii) a shape such that when disposed between the radio transmitter and the antenna, the absorber material receives a signal from the radio transmitter at a first power level, and reduces a signal power of the signal to a second power level below the first power level.

2. The system of claim 1, wherein:
the radio transmitter is configured to generate the signal at the first power level for transmission to the absorber material; and
the antenna is coupled to the radio transmitter, and configured to transmit the signal at a third power level greater than the first power level.

3. The system of claim 2, wherein the antenna is configured to apply a gain to the signal having the second power level, the applied gain setting a power level of the signal to the third power level.

4. The system of claim 1, wherein the absorber material provides an attenuation of about 6 dB, about 10 dB, or about 15 dB.

5. The system of claim 1, wherein:
the absorber material has one of a cylindrical shape or a doughnut shape.

6. The system of claim 2, wherein the absorber material is disposed in a central region of an interface between the radio transmitter and the antenna.

7. The system of claim 1, wherein a central axis of the absorber material is co-aligned with a signal path of the generated signal between the radio transmitter and the antenna, the central axis extending along a length of the absorber material and a width of the attenuator device.

8. The system of claim 1, wherein the attenuator device further comprises an Iodine layer disposed on the absorber material and configured to protect the absorber material from damage.

9. The system of claim 1, wherein the absorber material extends along an entire width of the attenuation device.

10. A method comprising:
receiving, at an attenuator device disposed between a radio transmitter and an antenna and directly contacting the radio transmitter and the antenna, a signal at a first power level;
reducing, using absorber material in the attenuator device, a signal power of the generated signal to a second power level below the first power level, a central axis of the absorber material being co-aligned with a signal path of the signal between the radio transmitter and the antenna, the central axis extending along a length of the absorber material and a width of the attenuator device, wherein the absorber material has an outer circumference that matches a circumference of an inner surface of a housing of the attenuator device; and
providing the signal to the antenna at the second power level.

11. The method of claim 10, further comprising:
generating, at the radio transmitter, the signal for transmission to the attenuator device; and
transmitting, by the radio transmitter to the absorber material, the signal.

12. The method of claim 10, further comprising:
   transmitting, by the antenna, the signal at a third power level greater than the first power level.

13. The method of claim 10, further comprising:
   manipulating, by the antenna, the signal at the second power level by applying a gain to the signal having the second power level, the applied gain setting a power level of the signal to the third power level.

14. The method of claim 10, wherein the absorber material provides an attenuation of about 6 dB, about 10 dB, or about 15 dB.

15. The method of claim 10, wherein the absorber material has one of a cylindrical shape or a doughnut shape.

16. The method of claim 11, further comprising:
   disposing the absorber material in a central region of an interface between the radio transmitter and the antenna.

17. The method of claim 10, further comprising:
   disposing, on the absorber material, a protection layer comprising Iodine to protect the absorber material from damage.

18. The method of claim 10, wherein the absorber material extends along an entire width of the attenuation device.

19. The system of claim 1, wherein:
   the housing comprises a cavity having a volume determined, in part, by the inner surface of the housing; and
   the absorber material is disposed in the entire volume of the cavity.

* * * * *